United States Patent [19]
Bahnsen

[11] 3,868,707
[45] Feb. 25, 1975

[54] FILM HOLDING STRUCTURES FOR CAMERAS

[76] Inventor: Gerhard I. W. Bahnsen, Box 1297, South Lake Tahoe, Calif. 95705

[22] Filed: Mar. 22, 1974

[21] Appl. No.: 452,246

[52] U.S. Cl. .............................................. 354/202
[51] Int. Cl. ............................................ G03b 19/02
[58] Field of Search ...................... 354/159, 202, 288

[56] References Cited
UNITED STATES PATENTS
257,206   5/1882   Blair ........................................ 95/11

Primary Examiner—John M. Horan
Attorney, Agent, or Firm—William P. Green

[57] ABSTRACT

A camera having a generally U-shaped film retainer which is spring pressed forwardly toward a shoulder at the rear of the camera and acts to locate against that shoulder either a conventional film pack or another film holding structure having a portion which projects rearwardly through the cutaway region of the U-shaped retainer. The rearwardly projecting film holding structure may be a focal adapter device having a portion at its rear end forming a guideway into which a film holder can be slidably inserted to a position in which the film is spaced rearwardly beyond the normal film location in the camera to effect a predetermined known change in the camera-to-subject distance at which the camera is in optimum focus.

11 Claims, 9 Drawing Figures

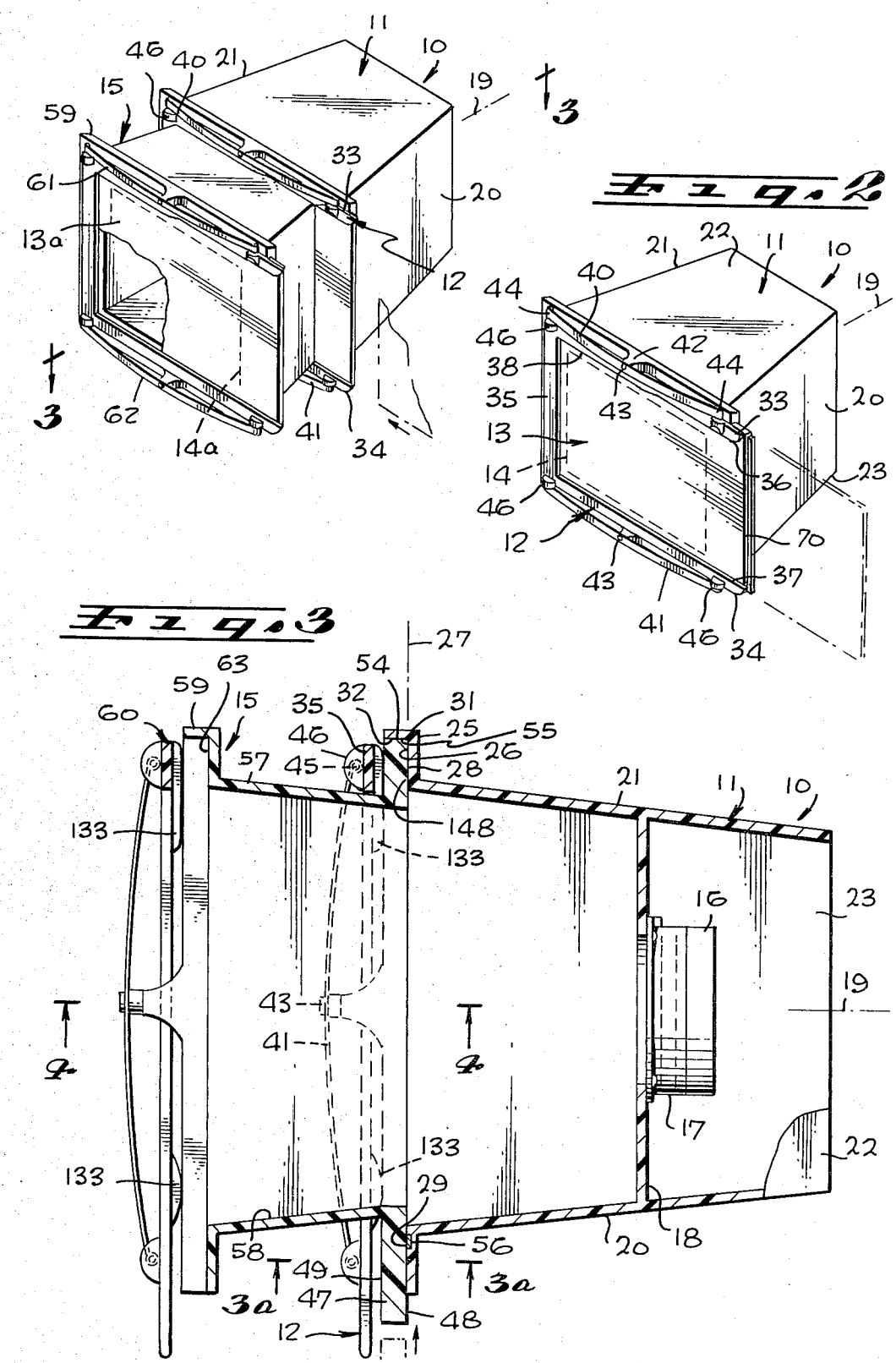

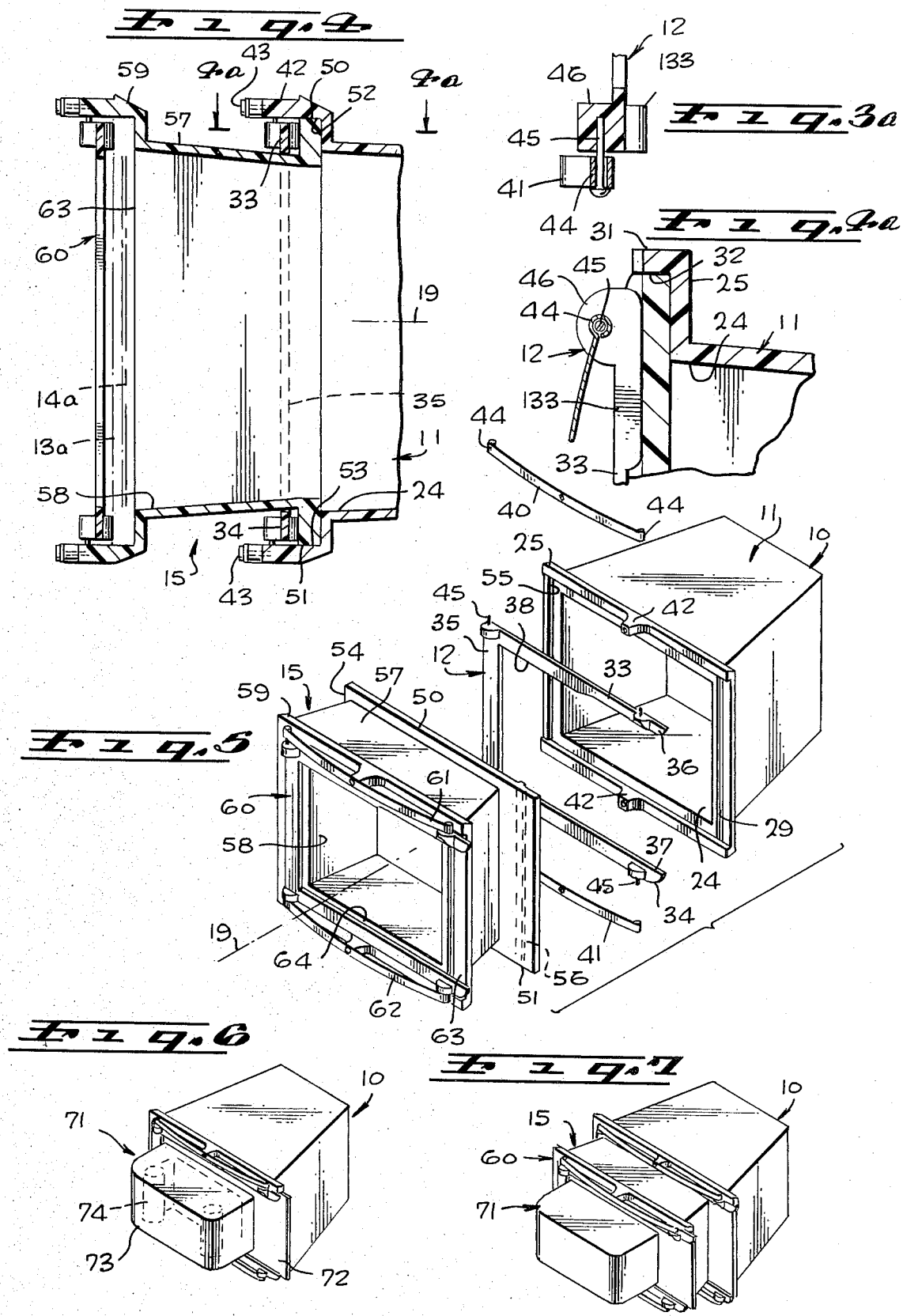

3,868,707

FILM HOLDING STRUCTURES FOR CAMERAS

BACKGROUND OF THE INVENTION

This invention relates generally to cameras and particularly to improved structures for holding film at desired locations in a camera.

In my U.S. Pat. No. 3,738,241 issued June 12, 1973 on "Camera With Film Spacer," I have disclosed a camera arrangement in which, for simplicity of operation and manufacture, the lens can if desired be of a fixed focus nonadjustable type, or if adjustable can be preset and left in a certain setting for various different conditions which would normally require lens adjustment, with the change in focus of the camera being effected by utilization of one or more focal adapter spacers for controllably changing the plane at which the film is held in the camera. These spacers act to shift the film rearwardly predetermined distances so that the image produced by the camera lens will be in focus on the film at different predictable camera-to-subject distances dependent upon and determined by the film plane.

SUMMARY OF THE INVENTION

A major purpose of the present invention is to provide an improved adapter which is constructed to relocate the effective film plane in a camera assembly to accomplish the same general result as in my above-discussed prior patent, but in a manner permitting a much greater change in the film plane and therefore a much greater change in the camera-to-subject distance or range of distances for which the camera is in proper focus. To attain these results, I utilize for holding the adapter a unique retainer unit, which is desirably given a U-shaped configuration, and is yieldingly urged forwardly toward the back of the camera to define a guideway into which a mounting flange of the new focal adapter is slidably receivable to removably attach the adapter to the camera. The adapter has a portion which projects rearwardly from the mounting flange through the central cutaway region of the U-shaped retainer, to a location rearwardly beyond that U-shaped retainer, and then carries a film at the desired rearwardly spaced location. The U-shaped configuration of the retainer permits this rearwardly projecting portion of the adapter to slide into and out of the cutaway region of the U-shaped member through an open side of that member, without interference of any type being offered by the retainer. For holding the film at the rear of the adapter, the latter may carry means forming a second guideway into which a film holder is slidably insertable in a direction transversely of the axis of the lens. This film holding means at the rear of the adapter may include a second U-shaped retainer, capable of retaining and locating a film holder which may project rearwardly through the cutaway region of that second U-shaped retainer. It is also contemplated that in lieu of the discussed rearwardly projecting focal adapter device, the first mentioned U-shaped retainer may receive and locate other types of film holding devices having rearwardly projecting portions, such as for example a roll film holder having a flange slidably retainable by the U-shaped element, and having a roll film mounting structure projecting rearwardly through the cutaway region of the U-shaped element.

BRIEF DESCRIPTION OF THE DRAWINGS

The above and other features and objects of the invention will be better understood from the following detailed description of the typical embodiments illustrated in the accompanying drawings, in which:

FIG. 1 is a perspective view of an assembly embodying the invention and including a camera having a rearwardly projecting focal adapter attached thereto;

FIG. 2 is a perspective view similar to FIG. 1, but showing the camera with the adapter removed, and with a conventional cut film pack or holder inserted in the back of the camera;

FIG. 3 is an enlarged horizontal section taken on line 3—3 of FIG. 1;

FIG. 3a is an enlarged fragmentary section taken on line 3a—3a of FIG. 3;

FIG. 4 is a fragmentary vertical section taken on line 4—4 of FIG. 3;

FIG. 4a is a fragmentary horizontal section taken on line 4a—4a of FIG. 4;

FIG. 5 is an exploded perspective view representing the FIG. 1 arrangement;

FIG. 6 is a view similar to FIG. 2 but showing a roll film holder attached to the camera; and FIG. 7 is a perspective view corresponding to FIG. 1 but showing a roll film holder connected to the back of the focal adapter.

DESCRIPTION OF THE PREFERRED EMBODIMENTS

With reference first to FIGS. 1 and 2, I have shown in those figures a camera 10 having a typically rigid hollow body 11 which carries at its back end a generally U-shaped retainer element 12 to be utilized for detachably securing a film holder to the back of the camera. In FIG. 2, this retainer 12 is shown holding in place a conventional essentially flat cut film holder 13, within which there is carried a flat photographic film represented diagrammatically by the broken lines 14. FIG. 1 shows the camera as it appears when retainer 12 is employed to secure to the camera a focal adapter 15, to the back of which a film holder 13a may be detachably connected at a location spaced rearwardly from but parallel to the position of holder 13 in FIG. 2.

The body 11 of the camera carries near its forward end a shutter 16 and lens unit 17, appropriately mounted to a front wall 18 of the camera body and having a lens axis 19. The body 11 may flare progressively to an increased transverse dimension as it advances rearwardly from the lens, and more specifically may have two planar opposite side walls 20 and 21 diverging as they advance rearwardly (FIG. 3), and two similar planar diverging top and bottom walls 22 and 23 (FIG. 4).

Lens 17 is preferably a fixed-focus type of lens which does not require any focus setting, to thereby allow maximum simplicity of operation of the camera. This lens is so designed as to focus an image of a particular photographic subject on the plane of film 14 of FIG. 2, when the subject is a particular predetermined distance from the camera, or is within a predetermined distance range, say, for example, between 8 feet and 30 feet from the camera lens. The same lens without adjustment will function to produce a focused image on the plane of film 14a within holder 13a of FIG. 1 when the photographic subject is at a different predetermined distance from the camera. Thus, the addition of the adapter 15 to the camera effects an accurately predeterminable change in the camera-to-subject distance for which the camera is set, with a single lens 17 which may be very inexpensive by virtue of the lack of necessity for adjustability. It will be understood, however, that if desired, lens 17 may additionally be given some focus adjustability itself, to further increase the versatility of the overall assembly.

At the back end of camera body 11, this body forms a back opening 24 which is rectangular as seen in FIG. 5, and is centered about lens axis 19 to pass light rays from lens 17 through this opening to the film. About the location 24, the camera body has a peripheral rectangular flange 25, disposed transversely of axis 19 and projecting outwardly from and beyond the flaring walls 20, 21, 22, and 23 of the body. At the back side of this flange 25, the material of the camera body forms a rearwardly facing planar film locating shoulder 26, lying in a plane 27 which is perpendicular to lens axis 19. This shoulder preferably extends entirely about the periphery of rectangular opening 24, and is engageable by the forward face 28 of rectangular film holder 13 entirely about opening 24 in light-tight sealed relation. Toward its right as seen in FIG. 5, the shoulder 26 may contain a vertical groove 29, which is engageable by the usual vertical rib 30 on film holder 13 (FIG. 2) to retain the film holder in position in the camera.

About three of the four sides of opening 24, outwardly beyond shoulder surface 26, the flange 25 carries and forms a rearwardly projecting portion 31, defining an essentially recess 32 within which the rectangular holder 13 is receivable in closely confined relation and from which the holder is slidably removable in a rightward direction as viewed in FIGS. 2 and 5.

The retainer element 12 is located behind flange 25 and preferably opposite locating shoulder 26, and yieldingly holds the film holder 13 against that shoulder. Retainer 12 as viewed from the rear of the camera has two upper and lower arms 33 and 34 extending across the top and bottom respectively of the rear portion of the camera body, above and beneath opening 24, and an interconnecting cross piece 35 extending vertically along the left side of the camera body. The right ends 36 and 37 of arms 33 and 34 are unconnected, to form an open side of the retainer through which a portion of the adapter 15 may slide into and out of the rectangular cutaway region or aperture 38 formed by and within the U-shaped retainer 12 opposite opening 24. Each of the two horizontal arms 33 and 34 of retainer 12 has at its forward side a pair of rounded lugs 133 which are engageable with the rear face of film holder 13 to urge it forwardly.

For exerting yielding force forwardly against retainer 12, there may be provided along the upper and lower edges of the retainer a pair of elongated essentially parallel leaf springs 40 and 41, connected at their centers to projections 42 formed by the material of camera body 11, with these connections desirably being effected by two screws 43 extending through apertures in the centers of the springs and connecting into the projections 42. The springs project in opposite directions from their central mounting portions, and exert yielding force forwardly against retainer 12 through small loops 44 formed at the ends of the springs and receiving pins 45 carried by and projecting from lugs 46 formed at the rear sides of retainer arms 33 and 34. The springs are capable of normally urging retainer 12 into engagement with body shoulder 26, but are deformable against their resilience far enough rearwardly to allow reception of holder 13 between the retainer and holder 26.

To now describe the focal adapter 15, this adapter has at its forward end a flat peripheral flange 47 which may be of a rectangular configuration corresponding substantially to the shape of the peripheral portion of film holder 13, for reception within the same guideway 148 which receives holder 13 in FIG. 2, between retainer 12 and shoulder 26. More particularly, flange 47 has a planar forward surface 48 disposed transversely of axis 19 and engageable with shoulder 26 entirely about aperture 24 in light-tight sealed relation, and has a parallel planar rear face 49 also perpendicular to axis 19 and against which retainer 12 exerts forward force. The upper and lower parallel edges 50 and 51 of flange 47 are received in close proximity to and slidable along and guided by guideway surfaces 52 and 53 at the top and bottom of the rear portion of the camera body. The left edge surface 54 of flange 47 is insertable to a limiting position of engagement with end wall 55 of the guideway. A vertical rib 56 formed on the forward face of flange 47 is receivable within groove 29 in the body to releasably retain adapter 15 in the FIG. 1 position of connection to the camera body.

Projecting rearwardly from flange 47, the adapter 15 has four preferably flaring top, bottom and side walls 57, similar to the previously mentioned walls 20, 21, 22, and 23 of camera body 11, and containing and defining a rectangular light passage 58. This passage is centered with respect to axis 19 and extends rearwardly from and is opposite the back opening 24 of the camera body and extends from the plane of the forward face of flange 47 to the back end of walls 57. At the rearward extremities of walls 57, the adapter may have a peripheral transverse flange 59 constructed the same as the discussed flange 47 on the camera body, and carrying a preferably U-shaped retaining element 60 which may be identical to element 12, and be mounted to flange 59 by springs 61 and 62 constructed and mounted the same as the discussed springs 40 and 41 on the camera body. These springs 61 and 62 urge element 60 forwardly toward and against a rearwardly facing transverse shoulder 63 corresponding to shoulder 26 on the camera body, to form a guideway 64 which is essentially identical to the guideway formed between retainer 12 and shoulder 26, to slidably receive and locate and confine film holder 13a.

To summarize briefly the manner of use of the camera structure thus far described, when it is desired to take pictures at the primary distance for which the camera is intended, a film holder such as that shown at 13 in FIG. 2 is inserted leftwardly into the guideway formed between retainer 12 and the rear face of the camera body, to locate film 14 in holder 13 at a predetermined primary focal plane. The camera then automatically and inherently produces a properly focused image at that plane if the subject is within the proper camera to subject distance range.

When it is desired to take pictures at a changed distance for which adapter 15 is designed, holder 13 is pulled rightwardly out of the guideway within which it is received, by grasping the rightwardly projecting portion 70 of the holder as viewed in FIG. 2, and the adapter is then slid leftwardly to move its flange 47 into the guideway between element 12 and shoulder 26, as from the broken line position of FIG. 3 to the completely installed position shown in full lines in FIG. 3 and in FIG. 1. The U-shaped configuration of element 12 allows movement of the rearwardly projecting portion 57 of the adapter transversely into the cutaway region of the U-shaped element so that in the FIG. 3 position walls 57 can project rearwardly far beyond the plane of U-shaped retainer 12 to locate a film holder 13a at a rearwardly displaced location. Film holder 13a can be inserted into the guideway at the rear of the adapter in the same manner that holder 13 is inserted to the FIG. 2 position in the forward guideway. The film 14a within holder 13a is accurately located at a secondary focal plane for focusing thereon by lens 17 of an image of a subject at a changed predetermined and known camera-to-subject distance, different than that utilized in connection with holder 13 of FIG. 2. Thereafter, pictures can be taken at this changed camera-to-subject distance without change of the focal characteristics of the lens or other adjustment of the camera.

FIG. 6 shows the camera in use with a roll film holder 71 attached thereto in lieu of the holder 13 of FIG. 2. This roll film holder has a flange portion 72 shaped essentially the same as flange 47 of adapter 15, for sliding reception in the same guideway in which holder 13 is received in FIG. 2. Projecting rearwardly from flange 72, the holder 71 has a hollow housing portion 73, which is dimensioned to project rearwardly through and beyond the U-shaped retaining element 12, and which contains a roll 74 of film which is appropriately directed within housing 73 to the same plane at which film 14 was located in FIG. 2. In lieu of the roll film holder 71, it is contemplated that any of various other types of film holders may be mounted in the same manner, to project rearwardly through the cutaway region of the U-shaped retainer and to be easily slidable into and out of retained position at the back of the camera by provision of a flange such as that shown at 47 or 72 at the front of the holder.

FIG. 7 shows the manner in which the roll film holder 71 of FIG. 6, or any other similar relatively bulky film holder having a rearwardly projecting portion, can be mounted to the back of adapter 15, by virtue of the provision of the second U-shaped retainer element 60 at the back of that adapter. Holder 71 is slidable into the guideway formed in front of retainer 60, and is yieldingly held against the rearwardly facing shoulder at the back of the adapter by element 60.

While certain specific embodiments of the present invention have been disclosed as typical, the invention is of course not limited to these particular forms, but rather is applicable broadly to all such variations as fall within the scope of the appended claims.

I claim:

1. An assembly comprising a camera body having an opening at its rear side with a rearwardly facing shoulder extending at least partially about said opening; a lens mounted to said body at a location to focus an image of a photographic subject rearwardly through said opening; a retainer mounted movably to the rear of said body and yieldingly urged forwardly relative to said shoulder and adapted to yieldingly urge forwardly against said shoulder a film holder containing film onto which an image may br focused by said lens; said retainer being generally U-shaped to form two generally parallel spaced arms extending essentially along two opposite sides of said opening and a cross-piece interconnecting first ends of said arms and extending essentially along a third side of said opening, so that said arms and cross-piece define and extend about a cutaway region in said retainer which is opposite said opening in the body to pass light rays from said lens rearwardly through said opening and then through said cutaway region when a film holder is not present between said shoulder and retainer; and a focal adapter detachably connectible to the rear of said camera body in lieu of said film holder to locate a film a predetermined distance rearwardly of the position in which a film is held by said holder when the latter is held against said shoulder by said retainer, to thereby effect a change in the subject-to-camera distance at which an image is in focus on a film, said focal adapter including a flange which is slidable transversely of the axis of said lens from a position in which it is detached from the camera body into a space between said shoulder and said retainer and to an active position in which said flange is yieldingly urged forwardly against said shoulder by said retainer; said focal adapter having a hollow portion which is carried by said flange and projects rearwardly therefrom through said cutaway region of said U-shaped retainer to a location rearwardly beyond the retainer and contains a passage through which light rays from the lens can pass; said arms of said U-shaped retainer having second ends at a side of said adapter opposite that at which said cross piece is located and which second ends are spaced apart and free of interconnection to define therebetween an entrance throat through which said hollow rearwardly projecting portion of the adapter is movable transversely of said lens axis into said cutaway region of the U-shaped retainer as said flange slides transversely into said space between said shoulder and said retainer; said adapter including film retaining means at the rear of said rearwardly projecting portion thereof defining a generally transverse guideway into which a film holder and carried film are insertable to a position rearwardly beyond said U-shaped retainer for focusing an image through said lens, said opening in the camera body, said flange, said U-shaped retainer and said rearwardly projecting hollow portion of the adapter onto the film.

2. An assembly as recited in claim 1, including spring means connecting said U-shaped retainer to said camera body near the periphery of said retainer and causing said yielding actuation of the retainer forwardly relative to said shoulder.

3. An assembly as recited in claim 1, including detent means on said flange and said camera body for releasably retaining said adapter against removal from the body.

4. An assembly as recited in claim 1, including lug and recess detent means on the back side of said body and said flange interfitting in a relation releasably retaining said focal adapter against sliding movement from said active position behind said body.

5. An assembly as recited in claim 1, in which filmretaining means at the rear of said hollow portion of the adapter include means forming a rearwardly facing shoulder at the back of said hollow portion and extending about the rear end of said passage, and a backing structure mounted movably to said adapter and defining the back of said guideway and yieldingly urged forwardly against a film holder in said guideway to retain it against said last mentioned shoulder.

6. An assembly as recited in claim 1, in which said space between said retainer and shoulder, and said guideway at the rear of said hollow portion of the adapter, are of essentially the same rectangular configuration transversely of the lens axis to receive and mount a lens holder of the same size selectively at either of two axially spaced locations.

7. An assembly as recited in claim 1, in which said hollow portion of the adapter and said passage therein flare progressively to an increased transverse dimension as they advance rearwardly beyond said U-shaped retainer and toward said guideway.

8. An assembly as recited in claim 1, in which said film retaining means at the rear of said adapter include a second generally U-shaped retainer yieldingly urged forwardly relative to said hollow rearwardly projecting portion of the adapter.

9. An assembly as recited in claim 8, including a film holder having a flange urged forwardly by said second U-shaped retainer and having a portion projecting rearwardly through said second U-shaped retainer and carrying film rearwardly beyond said second U-shaped retainer.

10. The combination comprising a camera body having an opening at its back side and a rearwardly facing shoulder extending at least partially about said opening; a lens mounted to said body at a location to focus an image through said opening; and a film retainer connected movably to the rear of said body and yieldingly urged forwardly relative to said shoulder; said retainer being generally U-shaped to form two legs extending essentially along opposite sides of said opening and a cross-piece extending essentially along a third side thereof and interconnecting said legs, with a cutaway region formed within said U-shaped retainer through which a film holding structure can project rearwardly to carry film at a location rearwardly beyond said U-shaped retainer; said arms having second ends at a side of the retainer opposite that at which said cross-piece is located and which are spaced apart and free of interconnection to form an entrance throat through which said film holding structure can be moved transversely of the axis of said film from a detached position to a position of reception within said cutaway region of the retainer.

11. The combination as recited in claim 10, including a film holding structure as an element of the claim having a flange slidable into and out of a space between said U-shaped retainer and said shoulder and yieldingly used against said shoulder by said retainer, and having a portion projecting rearwardly through the cutaway region of the U-shaped retainer and carrying a film rearwardly therebeyond.

* * * * *